US009924738B2

(12) United States Patent
Graham

(10) Patent No.: US 9,924,738 B2
(45) Date of Patent: Mar. 27, 2018

(54) PNEUMATIC-DRIVEN DOUBLE-COMPRESSION POPPING APPARATUS

(71) Applicant: Frito-Lay North America, Inc., Plano, TX (US)

(72) Inventor: David Wallice Graham, Frisco, TX (US)

(73) Assignee: Frito-Lay North America, Inc., Plano, TX (US)

( * ) Notice: Subject to any disclaimer, the term of this patent is extended or adjusted under 35 U.S.C. 154(b) by 409 days.

(21) Appl. No.: 14/696,919

(22) Filed: Apr. 27, 2015

(65) Prior Publication Data

US 2016/0309771 A1    Oct. 27, 2016

(51) Int. Cl.
| | |
|---|---|
| *A23P 1/14* | (2006.01) |
| *A23P 30/36* | (2016.01) |
| *A23L 7/178* | (2016.01) |
| *A23P 30/10* | (2016.01) |
| *A23P 30/38* | (2016.01) |

(52) U.S. Cl.
CPC ............. *A23P 1/148* (2013.01); *A23L 7/178* (2016.08); *A23P 30/10* (2016.08); *A23P 30/36* (2016.08); *A23P 30/38* (2016.08)

(58) Field of Classification Search
CPC .......... A23P 1/148; A23P 30/36; A23P 1/105; A23L 7/178; A23L 7/161; A21C 11/006; A27J 27/08
USPC .......... 99/349, 353, 426, 439, 372; 100/232, 100/208
See application file for complete search history.

(56) References Cited

U.S. PATENT DOCUMENTS

| | | | | |
|---|---|---|---|---|
| 5,397,214 A | * | 3/1995 | Cheung | A21C 9/086 187/274 |
| 5,467,693 A | * | 11/1995 | Van den Berghe | A21B 5/02 99/349 |
| 5,755,152 A | * | 5/1998 | Menzin | A23P 30/10 425/261 |
| 6,662,436 B1 | * | 12/2003 | Andulics | B23P 15/006 29/54 |
| 2006/0028041 A1 | * | 2/2006 | Ono | B25J 9/142 294/119.3 |

* cited by examiner

*Primary Examiner* — Dana Ross
*Assistant Examiner* — Kuangyue Chen
(74) *Attorney, Agent, or Firm* — Colin P. Cahoon; Shaukat A. Karjeker; Carstens & Cahoon, LLP

(57) ABSTRACT

There is provided a double-compression, pneumatic-driven popping apparatus for making chip-like snack foods. The apparatus includes a first and second popping machine sections, each having a pneumatic-driven compression cylinder; and a mold plate coupled to the pneumatic cylinder and responsive to urging of the first pneumatic cylinder. A ring mold is located between the first and second machine sections and is subjected to compression by the first mold plate and the second mold plate. The apparatus has a pneumatic drive system including a compressed gas vessel, and a controller configured to control the pneumatic-driven compression cylinders independently through fast-acting control valves. During use, the apparatus applies pneumatic double-compression in a controlled manner such that a time interval between the first and the second compression steps is in the range of milliseconds, to produce a chip-like snack food product.

20 Claims, 2 Drawing Sheets

PNEUMATIC-DRIVEN DOUBLE-COMPRESSION POPPING APPARATUS

BACKGROUND

1. Field of the Invention

The technology relates to the snack food industry, and more particularly to an apparatus for the popping of pellets under heat and pressure to form snack foods.

2. Description of the Related Art

The production of snacks cakes of popped grains, such as for example rice cakes, is a process that includes subjecting the grains to heat and pressure in popping machines that are either hydraulically or pneumatically driven. During the popping process, the rice grains are subjected to both heat and pressure and become highly expanded. The resultant cakes have a low density compared to the rice grains due to volume expansion that takes place, and have significant thickness, for example, commonly in the range of about 1 inch (2.5 cm) or more, for an about 2-3 inch (5.0 to 7.5 cm) diameter cake.

Popping machines are also used in the production of a chip-like snack, from pellets of dough. These production processes may include a single compression step during which there is melting, heating, and expansion of the pellets into the final snack food product. In other cases, a double compression popping process may be used wherein a second compression follows the expansion of the product at the end of the first compression step to produce a chip-like snack food product, exemplified by Lay's® Air Pops (Lay's is a registered trademark of Frito Lay, USA). Typically, the second compression follows very rapidly after the first, for example, within about 5 to 10 milliseconds. Thus, compressive force for the second compression must build up very rapidly, after relaxation of compression at the end of the first compression step. For this reason, processes that include a second compression have been carried out on hydraulic-driven popping machines. Hydraulic-driven popping machines have a closed loop of hydraulic drive fluid, and are able to react very rapidly in terms of raising hydraulic fluid pressure to apply compressive force, releasing pressure and then, within a period measured in the millisecond range, again becoming pressurized to provide a second compressive force. In other words, hydraulic-driven machines can cycle at high speed from compression to relaxation, and back to compression.

Pneumatic machines are used in "single" compression popping processes. These machines lack the high speed pressure cycling capability of the hydraulic-driven machines, for several reasons. These reasons include, for example, that pneumatic-driven machines do not have a closed pneumatic circuit. Instead, they relieve pressure to the atmosphere after the first compression step. If there is to be a second compression step, atmospheric intake air must then be compressed for the second compression step. The rate at which a compressor can provide compressed air, starting from atmospheric pressure at air intake, imposes a time limitation on the development of sufficient compressive force. The time to develop sufficient compressive force may be in the multi-second range, for example of the order of about 8 seconds, depending upon the compressor and ancillaries, and is not in the millisecond range. As a result, in the prior art the double compression popping process to produce chip-like snack foods, which requires applying a second compression step within milliseconds of the first, is carried out on a hydraulic-driven popping machine.

SUMMARY

In an exemplary embodiment there is provided a double-compression, pneumatic-driven popping apparatus for making chip-like snack foods. The apparatus includes a first popping machine section that has a first pneumatic-driven compression cylinder; and a first mold plate coupled to the first pneumatic cylinder and responsive to urging of the first pneumatic cylinder. The apparatus also includes a second popping machine section that has a second pneumatic-driven compression cylinder, and a second mold plate coupled to the second pneumatic-driven cylinder and responsive to urging by the second pneumatic-driven cylinder. A ring mold, adapted for receiving therein a product to be subjected to a double compression process to produce a chip-like snack food, such as pellets, is located between the first and second machine sections and is subjected to compression by the first mold plate and the second mold plate. The apparatus further includes a pneumatic drive system including a compressed gas vessel, configured to receive and contain compressed gas from a source. The compressed gas vessel is in controlled, operative fluid communication with the first and second pneumatic-driven compression cylinders. The apparatus has a control system controlling the pneumatic drive system which is configured to control the pneumatic drive system to urge the first and second pneumatic-driven compression cylinders independently of each other to apply a double compression. The double compression is of a kind that produces a chip-like snack food product. The first compression step is followed within a few milliseconds by a second compression step in order to produce a chip-like product. In general, such a timing is less than 100 milliseconds.

In an exemplary embodiment, the time interval between the first compression and the second compression may be in the range from about 2 to about 75 milliseconds. In another exemplary embodiment, it may be in the range from about 2 to about 50 milliseconds.

An exemplary embodiment of the apparatus may include a first three-way control valve, downstream of the compressed gas vessel, that controls fluid communication between the compressed gas vessel and the first pneumatic-driven cylinder, and also second three-way valve that controls fluid communication between the compressed gas vessel and the second pneumatic-driven cylinder.

In an exemplary embodiment, the first and second three-way valves may be solenoid operated and controlled by the control system.

In a further exemplary embodiment, the apparatus may include a compressor supplying compressed gas to the compressed gas vessel. The compressed gas vessel may be sized such that it maintains an internal gas pressure, with minimal reduction in pressure, when the compressed gas is utilized in a double-compression popping operation to produce a chip-like product. A minimal reduction in pressure may be less than 5 psig.

In a further exemplary embodiment, the apparatus includes a first outboard pneumatically-driven compression cylinder, the first outboard pneumatically-driven compression cylinder is located outboard of the first pneumatic-driven compression cylinder and is in operative fluid communication with the compressed gas vessel, via a third three-way control valve, to apply compressive force to the ring mold, in concert with the first pneumatic-driven compression cylinder. The second section may also further comprise a second outboard pneumatically-driven compression cylinder, which is located outboard of the second pneumatic-driven compression cylinder and in fluid communication with the compressed gas vessel via a fourth three-way control valve to apply compressive force to the ring mold, in concert with the second pneumatic-driven compression cylinder. The controller is configured to operate the first, second, third and fourth three-way control valves independently of each other.

In another exemplary embodiment, the apparatus has a controller configured with timers that include a thickness delay timer, and a delay expansion timer. Accordingly, during use of the apparatus in double-compression popping operations, the thickness delay timer allows a gelatinized product in the ring mold to be held for a specified time, without application of compressive force, and the delay expansion timer controls a time for holding the first and second mold plates in a predetermined position.

In another exemplary embodiment, the controller may be configured with a bake timer that controls a time interval for holding an applied reduced compressive force, as compared to the double-compression force, on product in the ring mold.

BRIEF DESCRIPTION OF THE DRAWINGS

The novel features believed characteristic of the invention are set forth in the appended claims. The invention itself, however, as well as a preferred mode of use, further objectives and advantages thereof, may be best understood by reference to the following detailed description of illustrative exemplary embodiments when read in conjunction with the accompanying drawings, briefly described here.

DETAILED DESCRIPTION

The following non-limiting detailed descriptions of examples of embodiments of the invention may refer to appended Figure drawings and are not limited to the drawings, which are merely presented for enhancing explanations of features of the technology. In addition, the detailed descriptions may refer to particular terms of art, some of which are defined herein, as appropriate and necessary for clarity.

Figure 1:
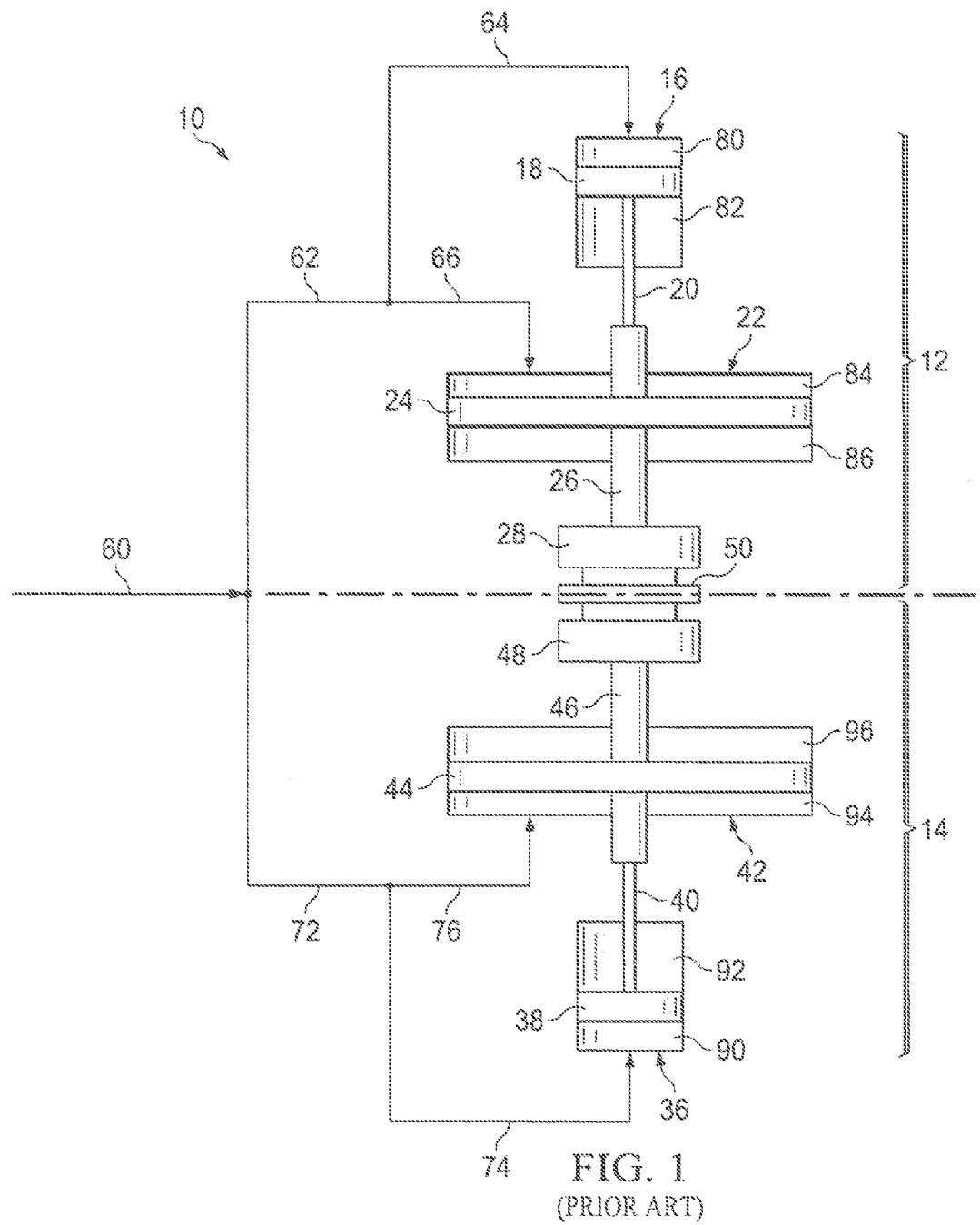
FIG. 1 is a schematic, not-to-scale, illustration of a prior art pneumatic-driven popping apparatus.

The inventions claimed herein, and exemplified by embodiments described herein, may be better appreciated upon a review firstly of a typical popping apparatus of the prior art, as illustrated schematically in FIG. 1. In order, from the top down, the illustrated prior art popping apparatus 10 has an upper machine section 12 and a lower machine section 14. The upper machine section 12 includes a top compression cylinder 16, equipped internally with a plunger 18, coupled to a shaft 20. Shaft 20 is mechanically coupled to the larger second top cylinder 22, which is equipped internally with a plunger 24, coupled to a shaft 26. Shaft 26 is mechanically coupled to, and operative to reciprocally drive an upper mold plate 28, which is used to compress pellets in the ring mold 50, directly beneath the mold plate 28. The lower machine section is virtually identical, in mirror-image. In order, from the bottom up, illustrated prior art popping apparatus 10 has a lower machine section 14 including a bottom compression cylinder 36, equipped internally with a plunger 38, coupled to a shaft 40. Shaft 40 is mechanically coupled to the larger second top cylinder 42, which is equipped internally with a plunger 44, coupled to a shaft 46. Shaft 46 is mechanically coupled to, and operative to reciprocally drive an lower mold plate 48, which is used to compress pellets in the ring mold 50, directly above the mold plate 28.

During operation, to produce a rice cake, for example, compressed air (or another gas) is delivered through a network of conduits to provide a pneumatic drive. Compressed air supplied in conduit 60 divides into two separate conduits with conduit 62 supplying the upper machine section 12, and conduit 72 supplying the lower machine section 14. The supply of compressed air to the upper and lower sections 12, 14 is simultaneous. Thus, during compression, as will be described, the rice grains in the ring mold are subjected to compression from above and below (and are also subjected to heat). In the upper machine section 12, compressed air in conduit 64 enters space 80 in the top cylinder 16, and drives the plunger 18 downward while expelling any air in the space 82, below the plunger. At the same time, compressed air in conduit 66 enters into space 84, urging plunger 24 downward and expelling any air in space 86 below the plunger. As a consequence of the downward-urging pneumatic force applied by the compressed air in top cylinder 16 and second cylinder 22, the upper mold plate 28 is urged downward to compressive force to rice grains in the ring mold 50, from above. At the same time, there is also compressive force applied in a pincer-like fashion to the pellets in the ring mold from below. That pressure is generated as follows: in the lower machine section 14, compressed air in conduit 74 enters space 90 in the bottom cylinder 36, and drives the plunger 38 upward while expelling any air in the space 92, above the plunger. At the same time, compressed air in conduit 76 enters into space 94, urging plunger 44 upward and expelling any air in space 96 above the plunger. As a consequence of the upward-urging pneumatic force applied by the compressed air in bottom cylinder 36 and second bottom cylinder 42, the lower mold plate 48 is urged upward to apply compressive force to rice grains in the ring mold 50, from above, at the same time as upper mold plate 28 applies compressive force from above.

From the foregoing, it is apparent that pellets in the ring mold 50 are compressed from above and below simultaneously. Upper mold plate 28 and lower mold plate 48 operate in concert, like jaws of a pincer closing on the ring mold 50, and do not operate independently of each other.

When compressive force is released, in other words, the compressing gas is vented from spaces 80, 84, 90, and 94, a rice cake product is produced. But, the time lag in the system to reduce pressure than re-pressurize spaces 80, 84, 90 and 94 is too great (about 8 seconds) to provide a second compression, if it were desired to produce a chip-like snack food, which requires a second compression step within a time range of a few milliseconds after the first compression. Moreover, the prior art apparatus lacks fine control of compression time.

Exemplary embodiments overcome the limitations of the prior art. Exemplary embodiment provides a capability to produce a chip-like snack food product by allowing double-compression in a pneumatic-driven popping apparatus, where the interval between the first and the second compression is in the millisecond range, such as from about 2 to about 75 milliseconds. In another embodiment the range may be 2-50 milliseconds; and in a further embodiment from about 3 to about 15 milliseconds. Regardless, the time interval is significantly less than the about 8 second time of the prior art, and is less than 100 milliseconds. Moreover, the exemplary embodiments allow control of dwell times at a desired compressive force, and allow reduction of the applied compressive force, and dwell time at the reduced applied force. It has been found, unexpectedly, that the selection of dwell times at a particular applied compressive force has an influence on the texture of the chip-like product that is produce. Thus, manipulation of dwell time and quantum of applied force enables the production of chip-like products having more particularly desired texture properties.

Figure 2:
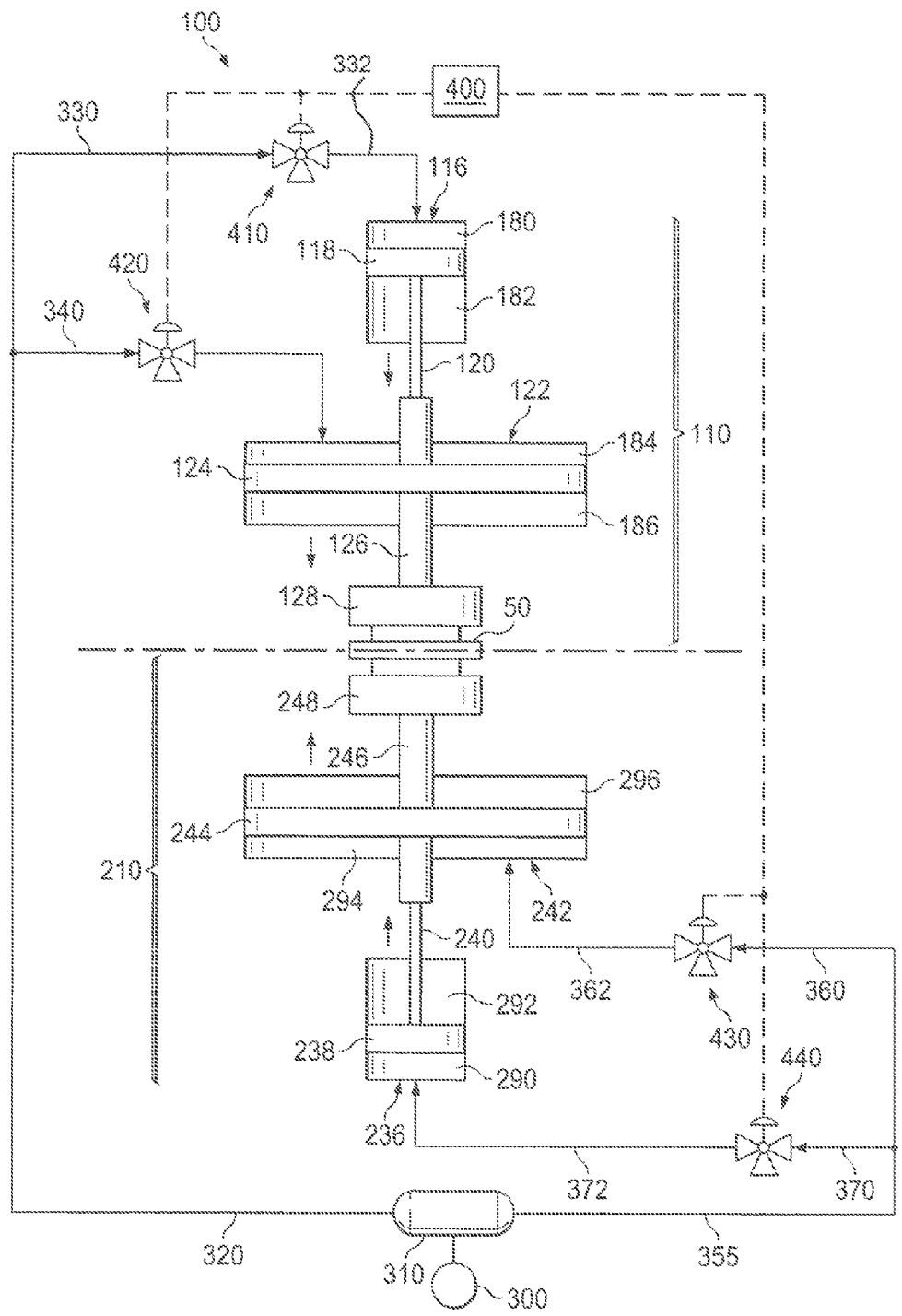
FIG. 2 is a schematic, not-to-scale, illustration of an exemplary double-compression, pneumatic-driven popping apparatus.

The exemplary embodiment of the pneumatic-driven, double-compression popping apparatus 100 that is illustrated schematically in FIG. 2, includes an upper machine section 110, and a lower machine section 210. Also shown, is a schematic of the compressed gas circuit that provides pneumatic driving force, the controller, and valves (not all valves and ancillaries are shown, to simplify the drawing for purposes of explanation). Further, the illustration depicts schematically a controller and a control circuit.

The upper machine section 110 includes the top cylinder 116, the second upper cylinder 122 and the upper mold plate, mechanically coupled as explained above. Similarly, the lower machine section 210 includes the bottom cylinder 236, the second lower cylinder 242 and the lower mold plate 248, mechanically coupled together as before. However, the pneumatic drive circuit (and the controller of the circuit) has been changed significantly from the prior art resulting in enhanced capabilities, including double-compression with the ability to produce chip-like snack foods, and unexpectedly also the ability to produce products having more customizable organoleptic properties, such as texture, not heretofore possible. In addition, the controller has a different configuration in order to control the pneumatic drive circuit which includes additional control valves permitting flexibility of operation of the upper section 110 and the lower section 210 independently of each other.

In the illustrated exemplary embodiment, a compressed gas (air, for example) source 300, which may be a compressor, supplies compressed gas to a compressed gas pressure vessel 310, that is suitable sized such that gas used from the vessel in a cycle of double-compression does not significantly affect the pressure in the vessel. Thus, vessel 310 effectively acts as a reservoir of compressed gas to maintain a gas pressure within the pneumatic drive circuit at or near a desired control pressure, which is generally, but not necessarily in that range 65 to 125 psig. Thus, desirably, during a double-compression operation, when gas flows from the gas vessel 310, the pressure in the compressed gas vessel 310 is maintained within about 5 to 10 psig of the control pressure. During operation, compressed gas from vessel 310 flows through conduit 320 and separates into two streams 330, 340. Conduit 330 carries pneumatic drive gas through three-way valve 410 to the top cylinder 116, while conduit 340 flows gas through three-way valve 420 to the second upper cylinder 122. The three way valves 410 and 420 are controlled by controller 400, and are preferably fast-acting solenoid control valves. Thus, the compressed gas from valve 410 flows through conduit 332 into the space 180 above the plunger 118 of top cylinder 116, pushing gas/air out of space 182, to urge the shaft 120 downward. Likewise, gas flowing through valve 420 in conduit 342 enters the space 184 of second upper cylinder 122 to urge the plunger 124 downward, forcing air/gas out of space 186, and driving the shaft 126 downward, to urge the upper mold plate 128 to the ring mold 50, during a compression step.

During compression, in the illustrated embodiment, compressed gas flows through conduit 355 and splits into two streams 370, 360. Compressed gas flows in conduit 370 flows through a three-way valve 440, and thence via conduit 372 to the space 290 below plunger 238 of bottom cylinder 236, forcing air/gas out of space 292, to force shaft 240 upward. Likewise, compressed gas in stream 360 flows through a three-way valve 430, and thence via conduit 362 to the space 294 below plunger 244 of bottom cylinder 236, forcing gas/air out of space 296, to force shaft 246 upward to urge the lower mold plate 248 to compress any product in the ring mold 50.

From the foregoing, it is apparent that in the exemplary embodiment the controller 400 is configured to control valves 410, 420, 430 and 440 independently so that pneumatic pressure applied to each of the top cylinder 116, the second upper cylinder 124, the bottom cylinder 236 and second lower cylinder 242. In addition, the reservoir capability provided by the vessel 310 permits the pneumatic circuit to maintain gas pressure and permits rapid re-establishment of compressive pneumatic pressure, within less than 100 milliseconds after a first compression step.

During operation in the double-compression step mode, the controller 400 has unprecedented flexibility to independently control timing of operation of the three-way fast acting valves. For example, to produce a chip-like product, the controller 400 may direct compressed gas to flow through valves 410 and 420 to drive the top cylinder 116 and second upper cylinder 122. Simultaneously, or within milliseconds thereafter, the controller 400 may direct compressed gas to flow through valves 430, 440 to further compress product in the ring mold 50 by applying pressure to bottom cylinder 236 and lower mold plate 248. The flexibility provided allows the production of double-compression chip-like products with texture properties not heretofore possible with a pneumatic-driven popper apparatus.

Significantly, the controller can also control the time for compression during the first and second compression steps. For example, the controller may set a "thickness delay timer." This is a time during which, between the first and second compression step, the gelatinized product in the mold is held in the mold, with a slight gap in the mold, without pressure being applied. This feature is clearly not achievable with the prior art pneumatic-driven popping apparatus.

Further, the controller may set a "delay expansion timer." During the delay expansion time, the top and bottom plates are held in fixed position, not necessarily at maximum compression only, for a specified time period. Control of this variable has unexpectedly allowed for the production of chip-like, double-compressed products having customizable organoleptic properties, such as texture, based on the delay expansion time.

In addition, the controller may be set for a "bake timer." During the time set by the bake timer, the upper and lower molds are held in position, but at a reduced compression force, as compared to the force applied during double compression steps.

While examples of embodiments of the technology have been presented and described in text and some examples also by way of illustration, it will be appreciated that various changes and modifications may be made in the described technology without departing from the scope of the inventions, which are set forth in and only limited by the scope of the appended patent claims, as properly interpreted and construed.

The invention claimed is:

1. A double-compression, pneumatic-driven popping apparatus for making chip-like snack foods, the apparatus comprising:

(a) a first popping machine section including:
   (i) a first pneumatic-driven compression cylinder;
   (ii) a first mold plate coupled to the first pneumatic-driven compression cylinder and responsive to urging of the first pneumatic-driven compression cylinder;
(b) a second popping machine section including:
   (i) a second pneumatic-driven compression cylinder;
   (ii) a second mold plate coupled to the second pneumatic-driven compression cylinder and responsive to urging by the second pneumatic-driven compression cylinder;
(c) a ring mold located between the first and second popping machine sections to be subjected to compression by the first mold plate and the second mold plate;
(d) a pneumatic drive system including a compressed gas vessel, configured to receive and contain compressed gas from a source, the compressed gas vessel in controlled and operative fluid communication with each of the first and second pneumatic-driven compression cylinders, wherein the operative fluid communication with the first pneumatic-driven compression cylinder is independent of the operative fluid communication with the second pneumatic-driven compression cylinder; and
(e) a control system controlling the pneumatic drive system, the control system controlling the pneumatic drive system to urge the first pneumatic-driven compression cylinder independently of the second pneumatic-driven compression cylinder to apply a second operative compression spaced, by a time interval of from about 2 to about 75 milliseconds, from a first operative compression to the ring mold.

2. The apparatus of claim 1, wherein the pneumatic drive system comprises a first three-way control valve downstream of the compressed gas vessel controlling fluid communication operative for pneumatic operation between the compressed gas vessel and the first pneumatic-driven compression cylinder, and a second three-way control valve downstream of the compressed gas vessel controlling fluid communication operative for pneumatic operation between the compressed gas vessel and the second pneumatic-driven compression cylinder.

3. The apparatus of claim 2, wherein the first and second three-way control valves are solenoid operated valves and are each controlled independently by the control system.

4. The apparatus of claim 1, further comprising a compressor, the compressor in fluid communication with the compressed gas vessel and sized for supplying compressed air to the vessel.

5. The apparatus of claim 1, wherein the compressed gas vessel is sized to provide compressed gas with a reduction of gas pressure in the compressed gas vessel during a double compression process, including a first compression step and a second compression step.

6. The apparatus of claim 2, wherein the compressed gas vessel is sized to provide compressed gas with a reduction of gas pressure in the compressed gas vessel during a double compression process, including a first compression step and a second compression step.

7. The apparatus of claim 1, wherein the first popping machine section further comprises a first outboard pneumatically-driven compression cylinder, the first outboard pneumatically-driven compression cylinder located outboard of, and mechanically coupled to, the first pneumatic-driven compression cylinder and in fluid communication with the compressed gas vessel to operatively apply compressive force in concert with the first pneumatic-driven compression cylinder to the ring mold.

8. The apparatus of claim 1, wherein the second popping machine sections further comprises a second outboard pneumatically-driven compression cylinder, the second outboard pneumatically-driven compression cylinder located outboard of, and mechanically coupled to, the second pneumatic-driven compression cylinder and in fluid communication with the compressed gas vessel to operatively apply compressive force, in concert with the second pneumatic-driven compression cylinder to the ring mold.

9. The apparatus of claim 7, wherein the second popping machine sections further comprises a second outboard pneumatically-driven compression cylinder, the second outboard pneumatically-driven compression cylinder located outboard of, and mechanically coupled to, the second pneumatic-driven compression cylinder and in fluid communication with the compressed gas vessel to operatively apply compressive force, in concert with the second pneumatic-driven compression cylinder to product in the ring mold.

10. The apparatus of claim 7, further comprising a third three-way control valve downstream of the compressed gas vessel controlling fluid communication between the compressed gas vessel and the first outboard pneumatic-driven compression cylinder, and a fourth three-way control valve downstream of the compressed gas vessel controlling fluid communication between the compressed gas vessel and the second outboard pneumatic-driven compression cylinder.

11. The apparatus of claim 10, wherein each of the third and fourth three-way control valves is controlled independently of each other by the control system.

12. The apparatus of claim 2, wherein
   the first popping machine section further comprises a first outboard pneumatically-driven compression cylinder, the first outboard pneumatically-driven compression cylinder located outboard of the first pneumatic-driven compression cylinder and in fluid communication with the compressed gas vessel via a third three-way control valve to operatively apply compressive force, in concert with the first pneumatic-driven compression cylinder;
   the second popping machine section further comprises a second outboard pneumatically-driven compression cylinder, the second outboard pneumatically-driven compression cylinder located outboard of the second pneumatic-driven compression cylinder and in fluid communication with the compressed gas vessel via a fourth three-way control valve to operatively apply compressive force, in concert with the second pneumatic-driven compression cylinder; and
   wherein the control system is configured to operate the first, second, third and fourth three-way control valves independently of each other.

13. The apparatus of claim 1, wherein the control system is configured to include a thickness delay timer and a delay expansion timer,
   whereby during use in popping operations, the thickness delay timer allows a gelatinized product in the ring mold to be held for a specified time, without application of compressive force, and the delay expansion timer controls a time for holding the first and second mold plates in position.

14. The apparatus of claim 2, wherein the control system is configured to include a thickness delay timer and a delay expansion timer,
   wherein during use of the apparatus in popping operations, the thickness delay timer allows a gelatinized product in the ring mold to be held for a specified time, without application of compressive force; and the delay expansion timer controls a time for holding the first and second mold plates in position.

15. The apparatus of claim 1, wherein the time interval is from about 2 to about 50 milliseconds.

16. The apparatus of claim 1, wherein the pneumatic drive system, the control system controlling the pneumatic drive system to urge the first pneumatic-driven compression cylinder independently of the second pneumatic-driven compression cylinder to apply a second operative compression spaced, by a time interval of from about 3 to about 15 milliseconds, from a first operative compression to the ring mold.

17. The apparatus of claim 2 wherein the pneumatic drive system, the control system controlling the pneumatic drive system to urge the first pneumatic-driven compression cylinder independently of the second pneumatic-driven compression cylinder to apply a second operative compression spaced, by a time interval of from about 2 to about 50 milliseconds, from a first operative compression to the ring mold.

18. The apparatus of claim 2, wherein the pneumatic drive system, the control system controlling the pneumatic drive system to urge the first pneumatic-driven compression cylinder independently of the second pneumatic-driven compression cylinder to apply a second operative compression spaced, by a time interval of from about 3 to about 15 milliseconds, from a first operative compression to the ring mold.

19. The apparatus of claim 1, wherein the control system is configured to include a bake timer, wherein, during use of the apparatus, the control system applies the bake timer to control a time interval for holding an applied reduced compressive force of the first pneumatic-driven compression cylinder and an applied compressive force of the second pneumatic-driven compression cylinder, independently of each other, on the ring mold.

20. The apparatus of claim 2, wherein the control system is configured to include a bake timer, wherein, during use of the apparatus, the bake timer controls a time interval for holding an applied reduced compressive force of the first pneumatic-driven compression cylinder and an applied compressive force of the second pneumatic-driven compression cylinder, independently of each other, on the ring mold.

\* \* \* \* \*